United States Patent Office.

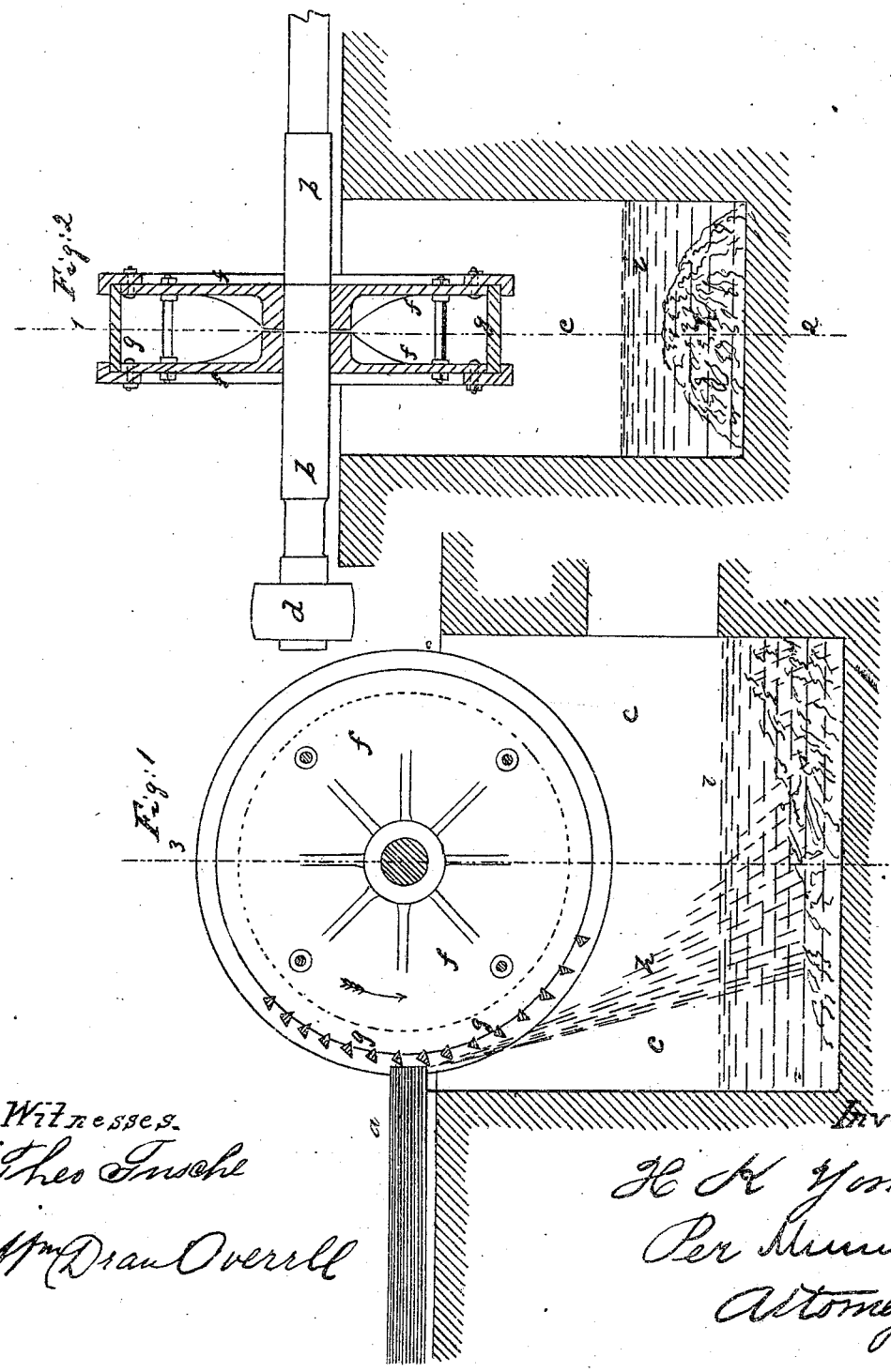

HENRY KINNAIRD YORK, OF CARDIFF, GREAT BRITAIN.

Letters Patent No. 72,579, dated December 24, 1867.

IMPROVEMENT IN THE MANUFACTURE OF IRON AND STEEL.

The Schedule referred to in these Letters Patent and making part of the same.

TO ALL WHOM IT MAY CONCERN:

Be it known that I, HENRY KINNAIRD YORK, of Cardiff, Great Britain, iron-master, have invented "Improvements in the Manufacture of Iron and Steel;" and I do hereby declare that the following is a full, clear, and exact description of the same, reference being had to the annexed sheet of drawings, making a part of the same.

This invention has for its object improvements in the manufacture of cast steel, and consists in manufacturing cast steel from cast iron by decarbonizing the cast iron whilst in the solid state, and by the fusion of this decarbonized iron with a certain proportion of *Spiegel eisen*, or any other description of cast iron containing carbon.

In carrying out my invention, I take pig-iron or cast iron of any description, previously heated to a temperature below the melting-point, and cut it up into small particles by means of circular saws driven at high velocity. The particles of iron thus cut up or torn apart are allowed to fall some distance through the atmosphere, by which means the iron is more or less decarbonized and purified, according to the distance the particles have travelled through the air.

The cutting or tearing-apparatus is completely cased in, so as to collect the particles of iron, and below the apparatus I place a pit or a cistern of water, into which the decarbonized particles of iron fall.

The form of saw or cutter that I prefer to use is of the following construction: On a spindle I place two wrought or cast-iron disks, about 3′ 0″ in diameter. These disks are keyed on to the spindle, with a space of five or six inches between them. Cross-bars of iron or steel are let into the circumference of these disks. These cross-bars form the teeth of the saw. They may be square or triangular in section, and they are fastened to the disks in such a way that they may readily be taken out and changed. The arrangement of these parts is more particularly shown by the drawing, fig. 1, hereto annexed.

The pig or cast iron to be operated upon is first heated in a furnace to any temperature below the melting-point. I then press this heated iron against the teeth of the revolving saw or saws. The friction of the saw or cutter against the iron will cut or tear the iron into small particles. These particles fall or are forced through the air by the velocity of the saw, and are collected in a pit or cistern placed below the cutter. Other forms of cutters may be used. I regulate the degree to which the iron is to be decarbonized by the depth the iron falls before it becomes cooled by the water in the pit. The particles of iron thus decarbonized and purified are then dried over a fire, and passed through a sieve, so as to remove any pieces or lumps of iron, above a certain size, that may have been broken instead of sawn off the pig, and consequently too large for being properly decarbonized.

For further carrying out my invention, I use ordinary steel pots, into which I charge the decarbonized iron, prepared as before described, with the addition of a certain proportion of a compound, consisting of iron, carbon, and manganese, such a compound being readily obtainable in the form of white cast iron, known by the name of *Spiegel eisen*, or I add any other description of cast iron containing carbon. The proportion of *Spiegel eisen* or other cast iron to be mixed with the decarbonized iron varies from about ten to twenty-five per cent., according to the nature of the result desired, the larger percentage of the *Spiegel eisen* or cast iron being approached in proportion to the hardness of the steel required. I then heat the said mixture of decarbonized iron and *Spiegel eisen* or cast iron in a suitable melting-furnace, or I use a reverberatory furnace, fed with pit-coal. When thoroughly melted, I pour the steel into a mould, so as to form an ingot of cast steel. This ingot can afterwards be rolled or worked by any other means into any required form.

When I treat the particles thus obtained for wrought iron, they are placed in a reverberatory furnace, and when at a welding-heat the particles are balled up, and then shingled and hammered in the usual way, or I work the particles of iron through the charcoal-finery. When working for steel the particles are melted in a crucible, with or without the addition of fluxes.

I have represented in the accompanying drawing the cutting or tearing-apparatus of my invention.

Figure 1 is a cross vertical section of the apparatus through the line 1–2 of fig. 2.
Figure 2 is a longitudinal vertical section of the same through the line 3–4 of fig. 1.
In these figures the same letters of reference stand for the like parts.

a, pig-iron or cast iron to be cut or torn in fine particles, which, after being decarbonized, serve for the manufacture of iron and steel. b, horizontal shaft, supported in proper bearings, and placed above a decarbonizing-cistern, c. At an end of this axis b is attached a pulley, d, imparting the movement to the machine. On this axis or shaft b, two disks, f, are fitted, connected to each other by means of metallic cross-bars g, of either triangular or any other suitable section. The metallic cross-bars g are secured on the periphery of the two disks f, and act as saw-teeth for cutting or tearing the iron pig or cast iron in fine particles. h shows the metallic particles dropped into the pit or cistern c, and decarbonized. i, water or other liquid in which said particles are immerged. j, exit-opening for the decarbonized iron.

Claim.

A new mode of decarbonizing cast iron. The making of cast steel by the mixing of particles of cast iron decarbonized with certain proportions of a compound, consisting of iron, carbon, and manganese, such compound being found in white cast iron, known by the name of "*Spiegel eisen;*" or, by the mixing of particles of cast iron, decarbonized, as before described, with the same cast iron not decarbonized, or other cast iron containing carbon, in the manner hereinbefore set forth.

HENRY KINNAIRD YORK.

Witnesses:
SAMUEL NASH,
P. W. CAREY.